F. B. SHAFER.
MILK TUBE.
APPLICATION FILED NOV. 30, 1908.

915,313.

Patented Mar. 16, 1909.

WITNESSES:

INVENTOR
FRANK B. SHAFER
BY 
ATTORNEYS

UNITED STATES PATENT OFFICE.

FRANK B. SHAFER, OF NORTHVILLE, MICHIGAN.

MILK-TUBE.

No. 915,313.　　　Specification of Letters Patent.　　　Patented March 16, 1909.

Application filed November 30, 1908. Serial No. 465,068.

*To all whom it may concern:*

Be it known that I, FRANK B. SHAFER, a citizen of the United States of America, residing at Northville, in the county of Wayne and State of Michigan, have invented certain new and useful Improvements in Milk-Tubes, of which the following is a specification, reference being had therein to the accompanying drawings.

In the use of teat tubes of the catheter or drain type in milking machines, it is necessary to prevent entrance of air to the teat passages when the tubes are being withdrawn and thus prevent the inflammation which is otherwise likely to occur.

This invention relates to a milk tube of the class indicated, wherein provision is made for preventing ingress of air as the tube is withdrawn, the tube being arranged for easy sterilizing.

Figure 1:
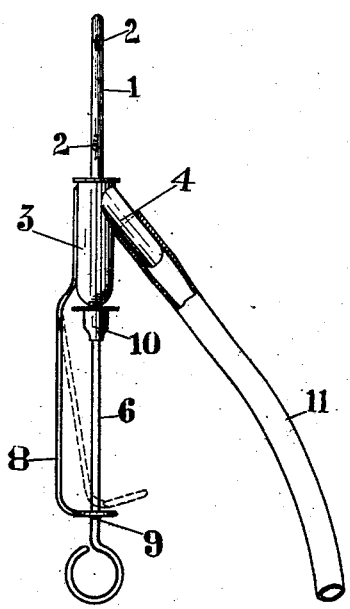
Figure 2:
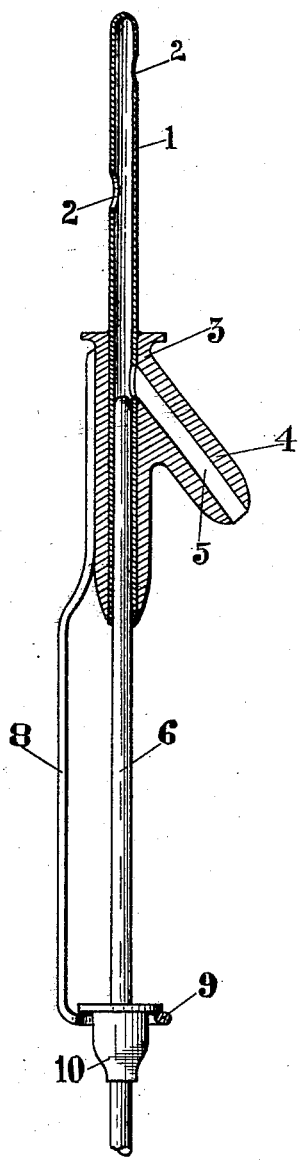
Figure 3:
Figure 3:

In the drawings, Figure 1 is a view in elevation, about actual size, of a milk tube embodying features of the invention. Fig. 2 is an enlarged view of the tube in longitudinal section, Fig. 3 is a view in detail of a piston stop.

Referring to the drawings, a tube 1 of proper dimensions for insertion in the teat, has a closed and smoothly rounded upper end and is provided with lateral milk inlets or apertures 2. A cylindrical casing 3 is secured on the lower open end of the tube with a lateral nipple 4, preferably oblique, having a longitudinal duct 5 connecting through an aperture in the tube with the bore of the latter. A cylindrical rod 6 is reciprocable in the tube 1 and is fitted to cut off the inlets and nipple passages when fully inserted. Its outward movement is limited by a spring wire 8 extending from the casing with its end turned into an incomplete eyelet 9 bent to encircle the rod and arrest a collar or stop 10 on the rod. By springing the arm as indicated in Fig. 1 so that the eyelet clears the rod, the latter may be withdrawn for cleansing. The nipple 4 is provided for convenient attachment of flexible tubing 11 running to a milk receptacle or other part of the apparatus. By this arrangement the tube may be completely closed before withdrawal, thereby preventing air from entering the teat through the lateral milk outlets as the latter pass out, as is common in the usual form.

Obviously, changes in the details of construction may be made without departing from the spirit of the invention and I do not care to limit myself to any particular form or arrangement of parts.

What I claim as my invention is:—

1. A teat tube comprising a slender insertion tube provided with lateral milk inlets adjacent its outer closed end and with a lateral nipple having a longitudinal passage in communication with the tube bore, a rod piston reciprocable in the tube adapted to close the nipple passages and inlets, and a spring member secured on the tube and adapted to limit the outward movement of the piston when in normal position and to clear the piston when deflected.

2. A teat tube comprising a slender tube closed at one end and provided with lateral apertures adjacent thereto, a cylindrical casing on the tube provided with a lateral nipple having a longitudinal passage opening into the tube, a rod longitudinally reciprocable in the tube, adapted to close the aperture and passage and a spring arm on the casing adapted to normally engage the rod and limit its outward movement.

3. A teat tube comprising a slender tube closed at one end and provided with lateral apertures adjacent thereto, a cylindrical casing on the tube provided with a lateral nipple having a longitudinal passage opening into the tube, a rod longitudinally reciprocable in the tube, adapted to close the apertures and passage, a stop in the rod, and a spring arm in the casing adapted to normally engage the rod and limit its outward movement.

In testimony whereof I affix my signature in presence of two witnesses.

FRANK B. SHAFER.

Witnesses:
　C. R. STICKNEY,
　OTTO F. BARTHEL.